T. A. EISEN.
CONSTRUCTION OF BUILDINGS.
APPLICATION FILED JULY 6, 1908.
915,421.
Patented Mar. 16, 1909.
6 SHEETS—SHEET 2.
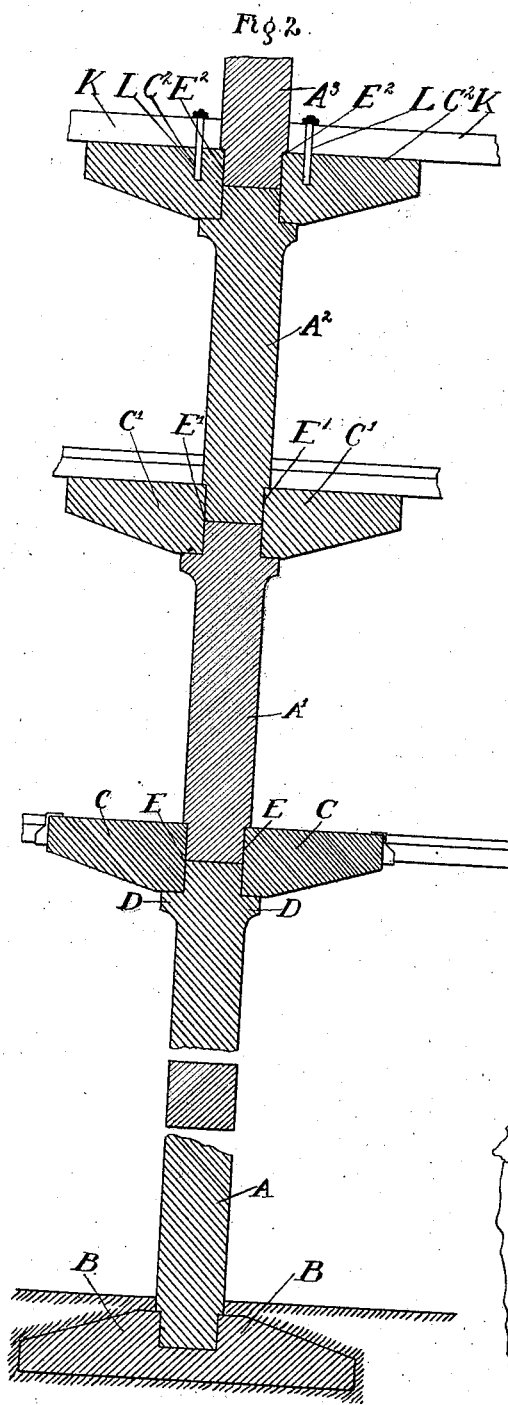
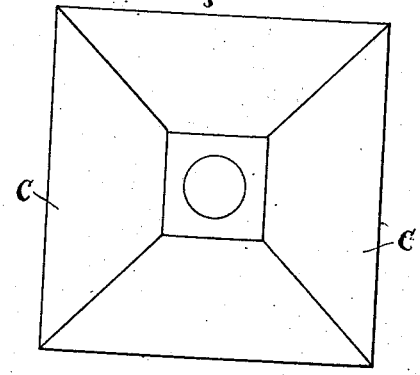
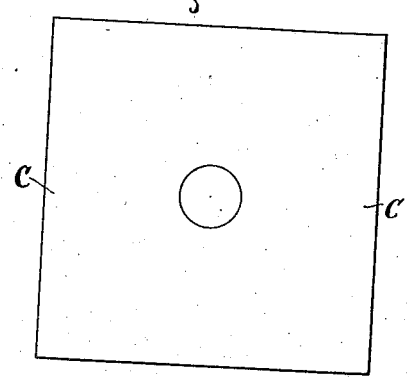
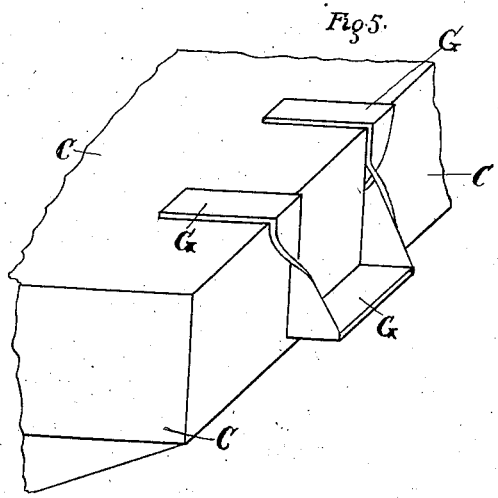
Witnesses
Inventor.
Theodore Augustus Eisen.
By John Day.
Attorney

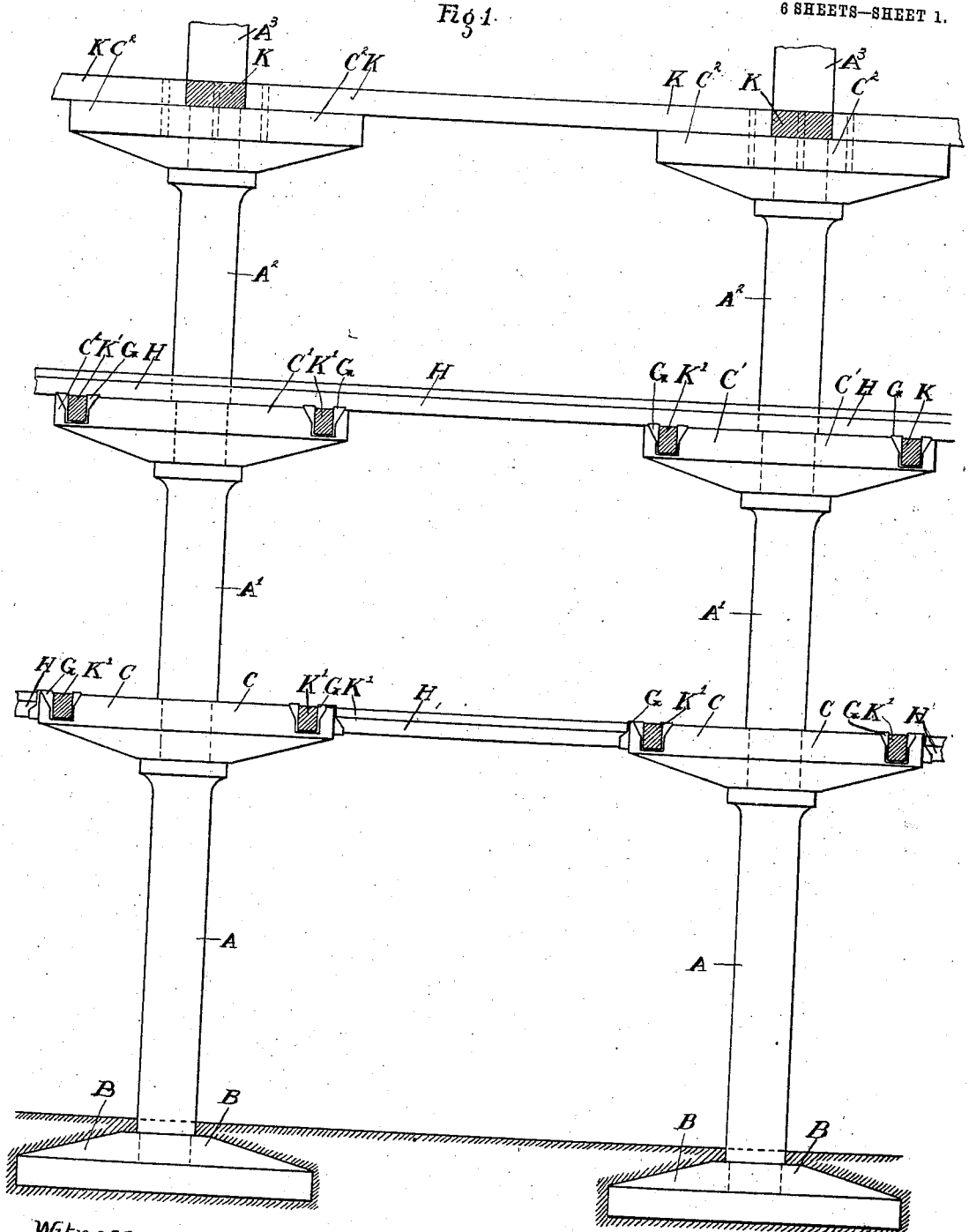

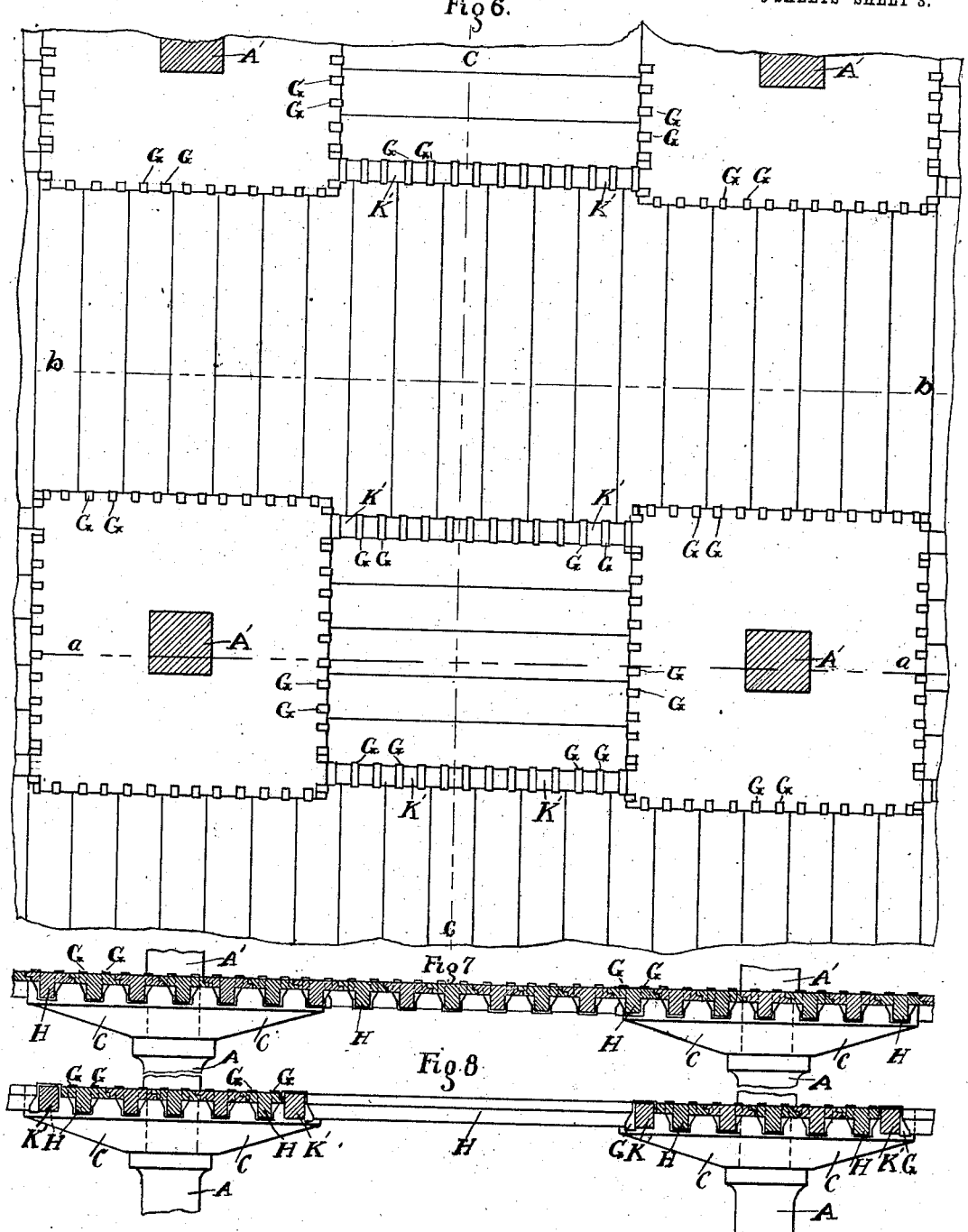

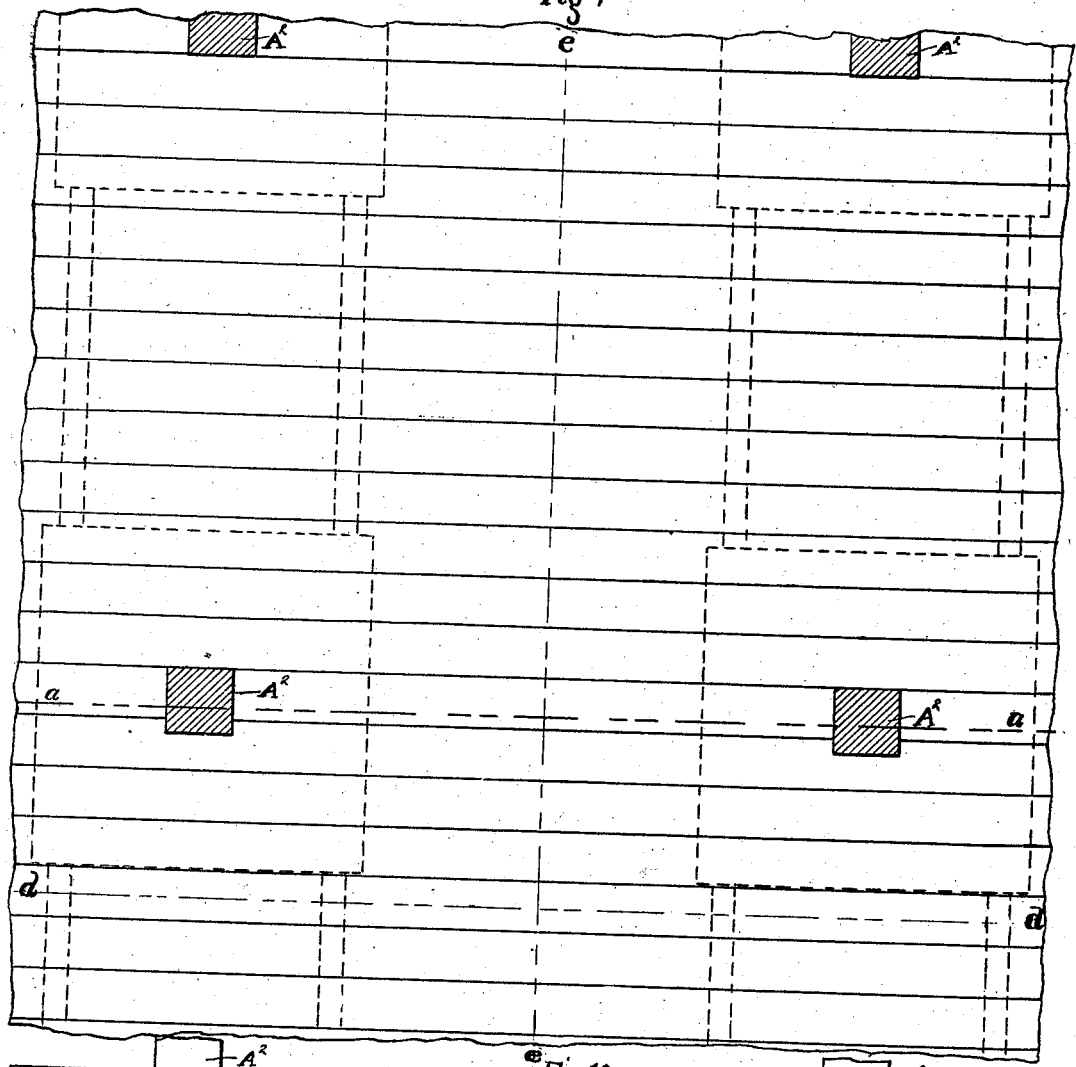

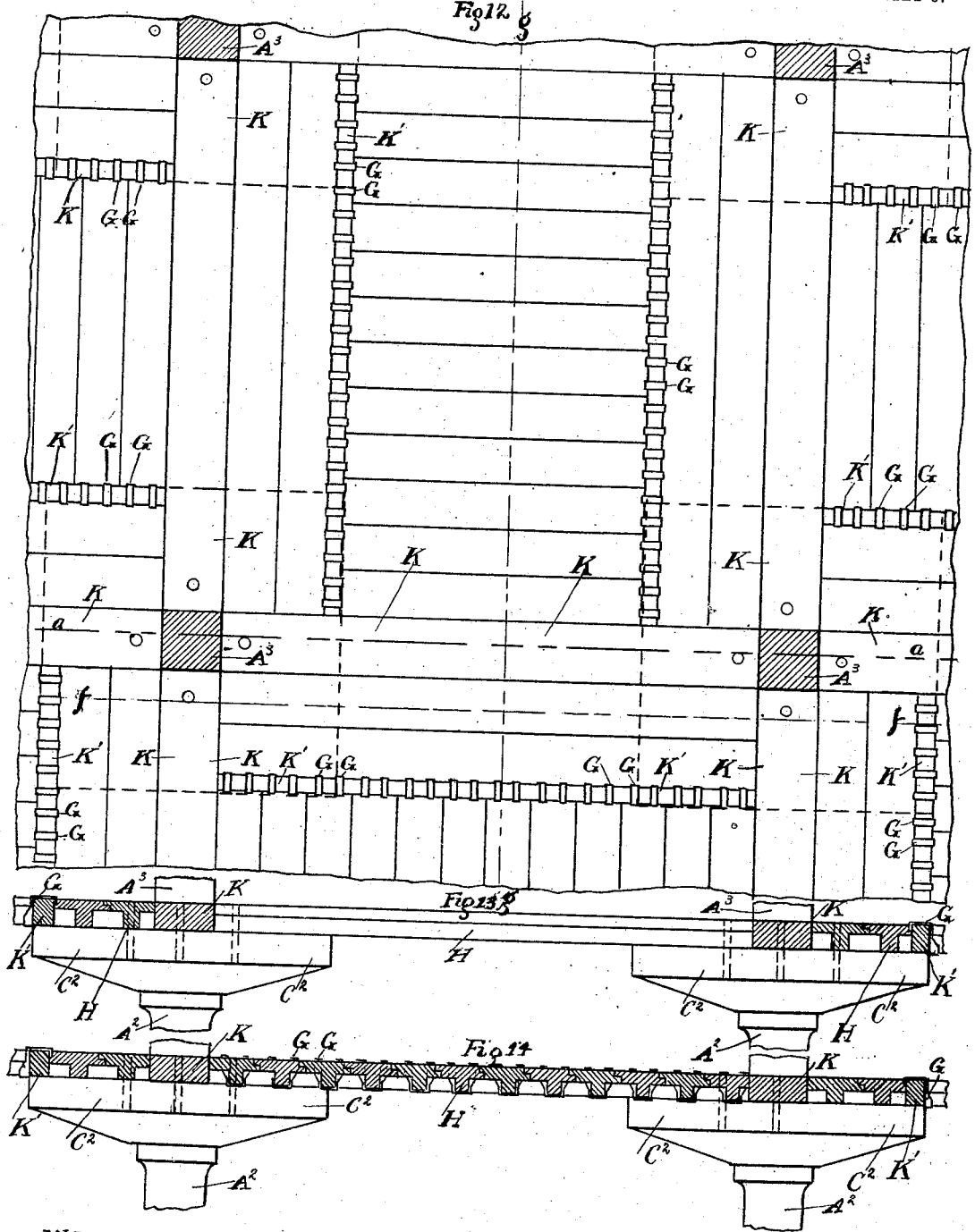

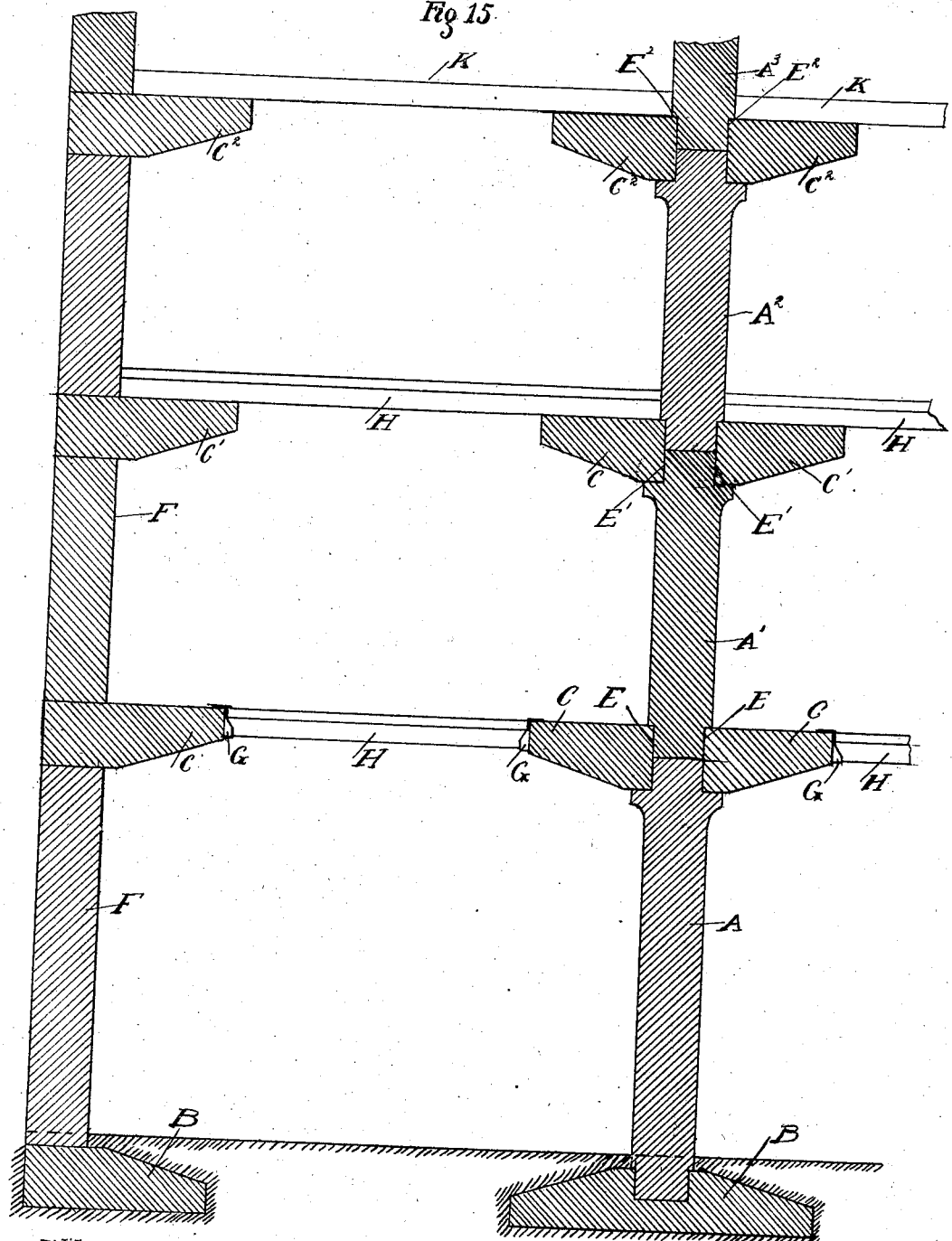

UNITED STATES PATENT OFFICE.

THEODORE AUGUSTUS EISEN, OF LOS ANGELES, CALIFORNIA.

CONSTRUCTION OF BUILDINGS.

No. 915,421.   Specification of Letters Patent.   Patented March 16, 1909.

Application filed July 6, 1908. Serial No. 442,227.

*To all whom it may concern:*

Be it known that I, THEODORE AUGUSTUS EISEN, of the city of Los Angeles, in the county of Los Angeles, in the State of California, have invented certain new and useful Improvements in the Construction of Buildings, of which the following is a full, clear, and exact specification, reference being had to the annexed drawings, and to the letters and figures marked thereon.

This invention which relates to improvements in the construction of buildings has especial reference to buildings composed of reinforced concrete, and it may be applied to buildings of steel or wooden construction with the same advantage which attach by the use thereof to buildings of reinforced concrete.

Among the objects which this invention achieves, there is one in particular which it is principally intended to subserve, namely, to provide a building having one or more stories and so that it shall be sufficiently elastic in its constitution that it will yield sufficiently and elastically to withstand a severe tendency to disturb or injure it, such as the tendency of an earthquake, while as distinct from an entirely rigid structure, which because of its rigidity, is liable to destruction from earthquakes and other forms of volcanic earth-tremors; the blows or tremors from earthquakes, or other volcanic disturbances are taken up by the elastic structure which my invention in its completeness consists of, and are by reason of that elasticity distributed throughout the structure without doing injury thereto.

My invention consists in respect of the columnar parts thereof, and the means of supporting the floors of the buildings attached to the columnar parts thereof, of cantaliver platforms, which may be of any convenient size, and which as an example of what I intend to be understood as using, have a length and breadth or diameter of about ten lineal feet, wherein the space between centers of columns is about twenty feet.

I construct the columns in such manner that each of said columns will carry one of the cantaliver platforms at a height corresponding with the several distances between the floors and ceilings of the successive apartments or divisions of the buildings.

In constructing the columns and cantaliver platforms, the columns and cantaliver platforms may be made so that the columns and cantaliver platforms are separated from each other, in which case the lower ends of the columns pass and fit snugly into a correspondingly shaped hole in the center of the top of the cantaliver platform, while the upper end of each column is so formed as to fit into the hole at the center of the bottom of the cantaliver platform. It is not, however, necessary to construct the columns and cantaliver platforms in separate sections in the manner hereinbefore stated, as the columns and cantaliver platforms may be cast monolithically in concrete, in molds so that each column has all the cantaliver platforms in each of such structural constituents of the building. In the case of using cast iron as the material for the columns and cantaliver platforms, they also may be cast in molds in one piece, and in the case of riveted, latticed or gusset plating methods of constructing columns and cantaliver platforms, these parts may be similarly formed alike, that is to say, of pieces of steel or iron riveted together in the manner commonly practiced, and having the cantaliver platforms riveted to the columns, or made separate from the columns, while having a hole in the center to receive the upper and lower ends of the sections of columns respectively, as these have been herein described, in the case of using concrete as the material of which said columns and cantaliver platforms are constructed.

According to my invention, when the columns and cantaliver platforms are erected, the spaces between the cantaliver platforms are filled in with girders or joists of concrete, or other material, the tops of which when in place are preferably on the same level as the tops of the cantaliver platforms each of which is a flat surface, and when flooring is placed over the cantaliver platforms and on the girders or joists, then continuous floors supported in equilibrium by the cantaliver platforms united with the columns exist on every floor of the structure. While the structure is thus very strongly supported at the floors it is at the same time an elastic structure in which the load upon any floor is capable of having its stress widely distributed over a large floor area, and the structure being elastic, therefore distributes throughout the building, earthquake and other volcanic disturbances which would tend to destroy the same, if such elasticity as this invention permits of were omitted, such thrust, for example, with horizontal and vertical components, which are so well known to produce destruction in altogether rigid structures, when subject to the influence of an earthquake shock or volcanic disturbance.

Upon the annexed drawings, Figure 1, is an elevation with certain parts in section, of a portion of a building having several floors, one above the other constructed in accordance with my invention, showing forms of applying the cantaliver platforms upon the vertical columns of the structure. Fig. 2, is a vertical section upon the line $a, a$, Figs. 6, 9, and 12. Fig. 3, is an inverted plan of one of the cantaliver platforms shown at Figs. 1, and 2. Fig. 4, is a plan of the top of one of the cantaliver platforms. Fig. 5, is a perspective view on an enlarged scale of parts of two of the edges of a cantaliver platform showing a well known form of hanger resting thereon, for carrying the girders or joists of the floor between the cantaliver platforms. Fig. 6, is a plan of four columns, four cantaliver platforms, and showing a method of supporting a floor thereon by hangers. Fig. 7, is a vertical section on the line $b, b$, Fig. 6. Fig. 8, is another vertical section on the line $c, c$, Fig. 6. Fig. 9, is another plan of four columns, four cantaliver platforms, and flooring attached thereto, in a slightly different manner from that shown in Figs. 7, and 8. Fig. 10, is a section on the line $d, d$, Fig. 9. Fig. 11, is a transverse section on the line $e, e$, Fig. 9. Fig. 12, is a plan in which the joists or girders constituting the floor are in part supported upon the flat tops of the cantaliver platforms, and also partly upon what I prefer to call "static girders." Fig. 13, is a transverse section upon the line $f, f$, Fig. 12. Fig. 14, is a transverse section upon the line $g, g$, Fig. 12. Fig. 15, is a transverse section through one of the side or end walls of a building, wherein the columns and cantaliver platforms are placed throughout the interior of a building in the manner corresponding to my present invention, it being explained that in the side or end of a building opposite to that shown in Fig. 15, the half cantaliver platforms projecting from the walls thereof necessarily project in opposite directions, that is to say, always toward the interior of the building, and always in line and level with the other cantaliver platforms carrying the several floors.

As shown by Figs. 1, 2, 6, 7, 8, 9, 10, 11, 12, 13, and 14, the vertical components of the load upon the floors of the structure are supported from floor to floor by means of the columns A, A', A², A³, etc. In cases where the columns are made in several pieces the bottom of the column is held in a recess in the center of the foundation block B, as shown more particularly in section in Fig. 2. At the upper end of the lower column A, as shown by Figs. 1, and 2, the cantaliver platform C, is carried, said column being formed with its upper portion of a diameter to fit into a hole in the center of the cantaliver platform C, the column A, at its upper end preferably having a projecting flange portion D, for giving horizontal support to the bottom of the cantaliver platform C. The cantaliver platform C, is of such depth that when the upper portion of the column A, is placed within the hole E, in the center of the cantaliver platform C, the next section of column A', has its base placed within the upper part of said central hole as shown at Fig. 2. In the same manner a second cantaliver platform C', is carried upon the top of the second column A', and a third column A², is similarly carried in the hole E', in the center of the second cantaliver platform C'. In the same manner the third cantaliver platform C², is carried upon the upper end of the third column A², and a fourth column A³, is carried in the same manner in the hole E², in the upper part of the third cantaliver platform C², and so on for any number of columns and cantaliver platforms extending through the vertical height of a building.

When the interior of a building has the columns erected within it, in their proper number and positions as hereinbefore described, then the cantaliver platforms are united to each other by the flooring placed on top of the beams or joists which may be of any suitable kind, examples of which I hereinafter describe. Before, however, that the building is in the condition for receiving the floorings, cantaliver platforms, corresponding to the cantaliver platforms C, hereinbefore described and shown upon the annexed drawings, are correspondingly placed in the walls of the building as shown at Fig. 15, that is to say, they are either built into the walls of the building as shown at F, or in the case of a building whose walls are of concrete they may be constructed in one piece with the walls. The upper face of each cantaliver platform is flat and level, and by preference is of rectangular form, such for example as the square indicating the top of the platform in Fig. 4, or it may have two of its opposite sides of greater or less length than the two other sides at right angles thereto.

The perspective view Fig. 5, shows an ordinary iron or steel hanger G, as placed in position on the edge of one of the cantaliver platforms C, in position to receive a transverse beam or joist, such as the beams or joists marked H, in Figs. 7, and 8. The beams or joists H, may be placed to lie at right angles to each other in the same floor, so that the ends of each of the beams or joists H, rest upon the hangers G, a number of such hangers corresponding to the number of such beams or joists being placed so as to be either suspended from or resting upon the upper edge or face of each cantaliver platform.

In Fig. 6, the flat palms or upper ends of the hangers G, are shown as resting and supported upon each of the four sides of each cantaliver platform, and for the purpose of supporting those beams or joists whose ends do not rest directly upon the cantaliver platforms I insert what I designate a trimmer K', toward the end of the two adjacent faces of the cantaliver platforms. The beams or joists stretching from cantaliver platform to cantaliver platform may be covered and smoothed over with cement, or any other suitable flooring material.

In place of using hangers of the kind marked G, in Fig. 5, and in other figures of drawings, I may use any other suitable kind of hanger of which there are several different forms and shapes manufactured, the hanger in itself constituting no part of my present invention, and I may use beams or joists of any suitable transverse section for stretching between the several cantaliver platforms of my improved building structure. When necessary and for the purpose of imparting greater stiffness to the building, and for distributing the floor load also which may be more heavily concentrated at some parts of a floor than at other parts, I use what I designate a "static beam" as shown at K, Figs. 1, 2, 12, and 15, that is to say, a beam which stretches entirely across two or more of the cantaliver platforms, that is to say, from column to column, and which is held down thereto by dowels L, as shown at Fig. 2, fastened into, and projecting upward from the upper flat top of the cantaliver platform and provided with screw nuts for holding down the said beams to each of the said platforms, either firmly or with any degree of yielding compatible with the design of the building.

When constructing a column with a series of cantaliver platforms monolithically arranged thereon in the manner hereinbefore described, of reinforced concrete, that is to say, a column with several cantaliver platforms thereon, I construct the same by pouring concrete into a mold wherein the column and cantaliver platforms are allowed to set until hard, in which case I obtain a column of any required length, and having in one piece with it cantaliver platforms of any required number all in one piece or structure.

I claim as my invention.

1. The combination of columns, cantaliver platforms forming part of the floors of a building centrally supported upon said columns, the parts of the floor between said cantaliver platforms being constructed of beams or joists whose ends are supported by hangers carried upon the edges of the cantaliver platforms, said beams or joists stretching from cantaliver platform to cantaliver platform throughout the structure.

2. The combination of columns, cantaliver platforms forming part of the floors of a building centrally supported upon said columns, cantaliver platforms in the walls of a building, the parts of the floor between said cantaliver platforms being constructed of beams and joists whose ends are supported by hangers carried upon the edges of the cantaliver platforms, said beams and joists stretching from cantaliver to cantaliver throughout the structure.

In testimony whereof, I have hereunto set my hand and seal at the city of Los Angeles aforesaid, in the presence of two subscribing witnesses.

THEODORE AUGUSTUS EISEN. [L. S.]

Witnesses:
 ST. JOHN DAY,
 IDA M. DASKAM.